(12) United States Patent
Carver et al.

(10) Patent No.: US 7,119,889 B2
(45) Date of Patent: Oct. 10, 2006

(54) APPARATUS FOR REDUCING AMBIENT LIGHT INTO AN OPTICAL PRINT SCANNER

(75) Inventors: John F. Carver, Palm City, FL (US); George W. McClurg, Jensen Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/977,946

(22) Filed: Nov. 1, 2004

(65) Prior Publication Data

US 2005/0094128 A1     May 5, 2005

Related U.S. Application Data

(60) Provisional application No. 60/515,448, filed on Oct. 30, 2003.

(51) Int. Cl.
*G05K 9/74* (2006.01)

(52) U.S. Cl. .................................................. 356/71

(58) Field of Classification Search ............ 356/71; 250/225, 227.28, 227.29, 227.24, 227.11; 382/124–127
See application file for complete search history.

(56) References Cited

U.S. PATENT DOCUMENTS

| 849,409   | A   |   | 4/1907  | Martin          |         |
|-----------|-----|---|---------|-----------------|---------|
| 4,415,242 | A   |   | 11/1983 | Major           |         |
| 4,733,309 | A   |   | 3/1988  | Mori et al.     |         |
| 5,736,734 | A   | * | 4/1998  | Marcus et al.   | 250/225 |
| 5,825,474 | A   |   | 10/1998 | Maase           |         |
| 2003/0206287 | A1 | * | 11/2003 | McClurg et al.  | 356/71  |
| 2004/0041998 | A1 | * | 3/2004  | Haddad          | 356/71  |

FOREIGN PATENT DOCUMENTS

DE     197 31 296 A1 * 7/1998
WO     WO 00/25676    * 5/2000

OTHER PUBLICATIONS

International Search Report, PCT Appln. No. PCT/US2004/036303, 4 pages.
Fingerprint Readers, www.aprint.com/aprintSmartTouch.html, [retrieved Jun. 3, 2003], two (2) pages.
SecuGen: Products>OEM>Physical Access Control, www.secugen.com/products/oem pac.htm, [retrieved Jun. 3, 2003], seven (7) pages.
About Exact ID, www.aprint.com/aprintFAQs.html, [retrieved Jun. 3, 2003], two (2) pages.
Electronic Photo Controls, Inc. 703.823.9098-Universal Contact Printer UCP-2, www.ephotocontrols.com/ucp2.htm, [retrieved Jun. 3, 2003], four (4) pages.
SentryScan™ Biothentica™ Spring 2003 Product Catalog, www.biothentica.com/exodus/SentryScan%20DL%20Series%20-%Spring2003.pdf, six (6) pages.

* cited by examiner

*Primary Examiner*—Michael P. Stafira
(74) *Attorney, Agent, or Firm*—Sterne, Kessler, Goldstein & Fox P.L.L.C.

(57) ABSTRACT

A light shroud reduces or eliminates the effects of ambient light on an optical fingerprint scanner. Because of the geometry of a prism used in the scanner, ambient light from only certain incidence angles can interfere with an image produced by the scanner. The light shroud blocks this ambient light entering the system at angles which allow the light to interfere with the illumination system or camera. In an embodiment, the light shroud can be closed to act as a cover, protecting the platen surface.

21 Claims, 10 Drawing Sheets

APPARATUS FOR REDUCING AMBIENT LIGHT INTO AN OPTICAL PRINT SCANNER

CROSS-REFERENCE TO RELATED APPLICATIONS

This application claims the benefit of U.S. Provisional Application No. 60/515,448, filed Oct. 30, 2003, hereby incorporated by reference herein in its entirety.

BACKGROUND OF THE INVENTION

1. Field of the Invention

The present invention relates to the field of biometrics. More specifically, the present invention relates to live scanning of prints.

2. Background Art

Print imaging systems can capture images of prints on thumbs, fingers, palms, toes, feet, and/or hands. Such print imaging systems are also referred to as live scanners, live print scanners, or simply scanners. Live scanners often include a light source, platen and camera. An object having a print pattern is placed on the platen. A platen is often one planar surface of a prism. The light source illuminates the platen. The camera captures an image of a print placed on the platen.

Many live print scanners utilize the optical principle of frustrated total internal reflection (TIR) to capture a high-quality image of a print pattern. Such a print pattern includes ridges and valleys that make up all or part of a print. For example, ridges on a finger can operate to alter the refraction index at a platen surface compared to valleys, thereby interrupting the TIR of light at the platen surface. This interruption in the TIR causes a high quality optical image representative of the ridges and valleys of a print pattern to be captured by a camera.

Certain illumination systems for live print scanners are susceptible to the effects of ambient light on image quality. However, a cover designed to stop all ambient background light from entering the prism would obscure a user's access to the platen surface and make the instrument harder to operate. Performing fingerprint rolls would also be difficult. Therefore, a method and apparatus are needed to reduce the effects of ambient light without compromising access to the platen by the user.

SUMMARY OF THE INVENTION

A light shroud preventing light from entering at specific angles can reduce or eliminate the effects of ambient light on an optical fingerprint scanner while allowing sufficient access to the platen by a user. The inventors recognized that there is a limited range of angles at which ambient light can enter the prism, contact the illumination system and be reflected back onto the surface of the platen, or otherwise make its way into the optical path and interfere with the imaging and/or illumination of the fingerprint.

The light shroud prevents light from entering at those angles with respect to the prism which would interfere with image quality. The light shroud can also serve as a protective platen cover when the instrument is not in use.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
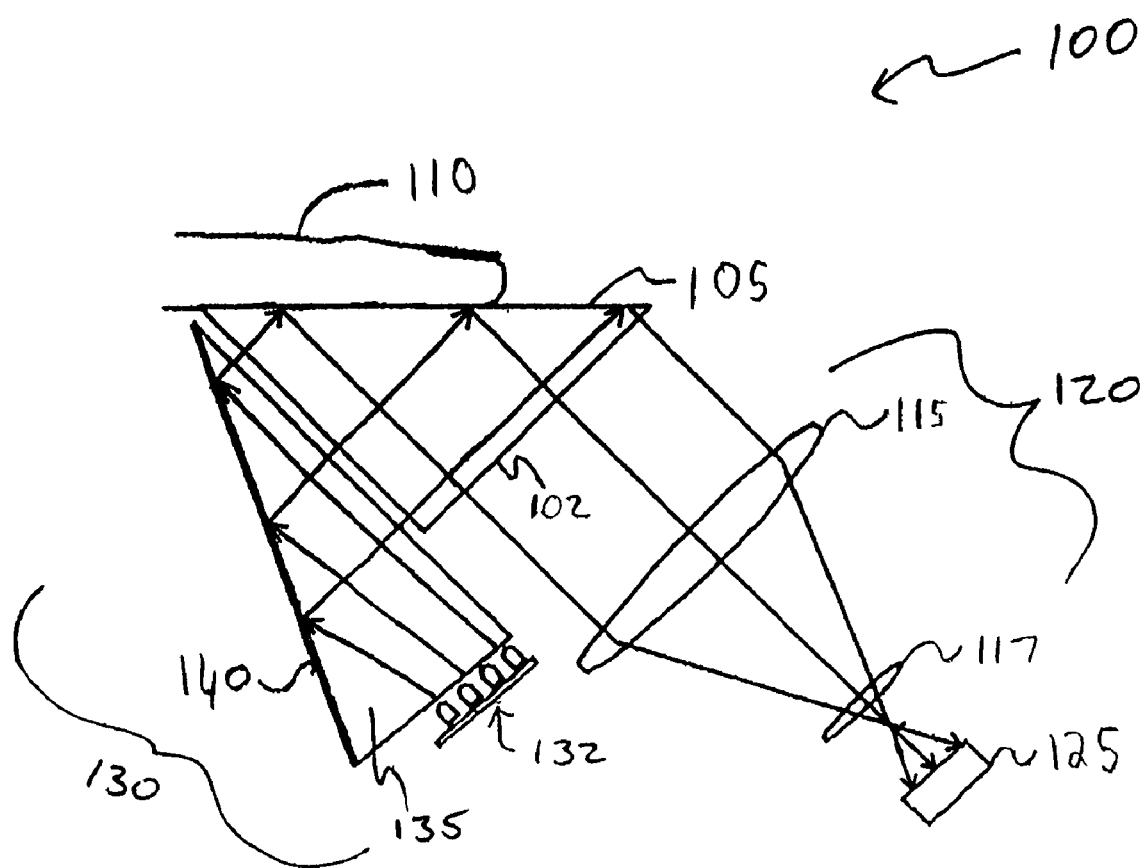
FIG. 1 is an illustration of a livescan fingerprinting system according to an embodiment of the present invention.

FIG. 1 shows a livescan fingerprinting system 100. Fingerprinting system 100 includes a prism 102 having a platen surface 105, an optical system 120, a camera 125, and an illumination system 130. Optical system 120 includes at least one optical element, such as lens 115 and/or lens 117, for conditioning and/or focusing the light into camera 125.

In the embodiment of FIG. 1, illumination system 130 includes a light source 132 and a light wedge 135. Light wedge 135 directs light from light source 132 to prism 102. Light wedge 135 may be a diffusing light wedge. A person of skill in the relevant art will recognize that light wedge 135 need not be a light wedge per se, but may be some other element for directing illumination light into prism 102.

To image, for example, a fingerprint, a finger 110 is placed on platen surface 105. Platen surface 105 may be a surface of prism 102. Alternatively, platen surface 105 may be a surface, such as a silicone rubber pad or a coating, coupled to the surface of prism 102. Although the present invention will be discussed with reference to imaging a finger, one of skill in the art will recognize that any object having a print pattern, for example and without limitation, a palm or a foot, may be imaged without departing from the spirit and scope of the present invention.

Light from light source 132 enters light wedge 135, and is reflected off of light wedge surface 140. Light source 132 can be any kind of light emitter. For example, light source 132 may include a plurality of light emitting diodes (LEDs). After exiting the light wedge, the light enters prism 102 and is reflected by platen surface 105. Illumination light from light source 132 from an imaging area of platen surface 105 continues towards camera 125. After leaving prism 102, the reflected light, carrying the print image, is focused and/or conditioned by optical system 120. Camera 125 then detects the print image. The path taken by light emitted from light source 132 to camera 125 is referred to herein as the optical path.

In a bright-field illumination embodiment, when a finger 110 is placed in contact with platen surface 105, the total internal reflection (TIR) within prism 102 is broken by ridges of finger 110. Thus, light will reflect from areas of platen surface 105 under valleys of finger 110, but will not reflect from areas of platen surface 105 under ridges of finger 110. The contrast between the ridges and valleys of finger 110 form an image that can be viewed by camera 125. In this embodiment, ridges may appear relatively dark while valleys and background areas may appear relatively bright in the captured print image.

Alternatively, depending on the orientation of the incident light, as in dark-field illumination, the light source may not be directly imaged by the optical system and the camera. In a dark-field illumination embodiment, the finger is directly illuminated, and light entering the print ridges is diffused and reflected back into prism 102 in the areas where the print ridges contact platen surface 105 and break TIR. The light reflected from the ridges is imaged by camera 125, thereby producing a representative print image. The valleys and background areas may appear relatively dark while ridges may appear relatively bright in the captured print image.

Figure 2:
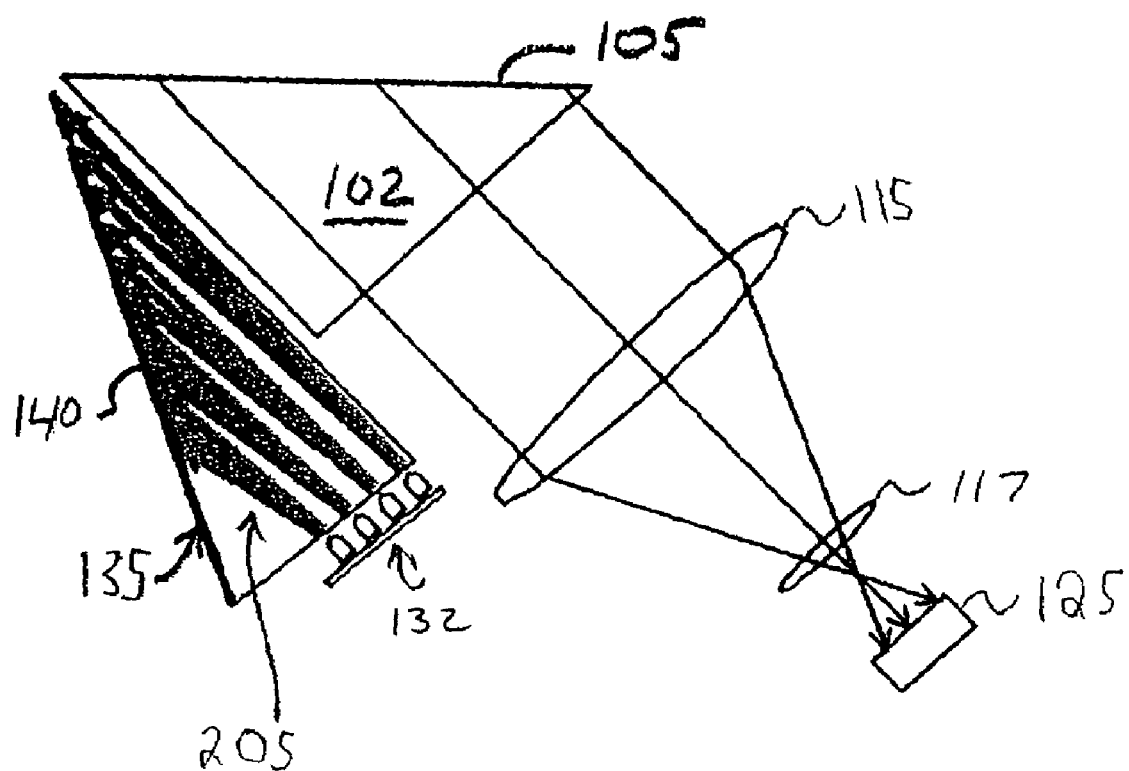
FIG. 2 is an illustration of a light source illuminating a light wedge according to an embodiment of the present invention.

FIG. 2 illustrates light source 132 illuminating light wedge 135. One function of light wedge 135 is to direct light so as to illuminate platen surface 105. Light rays 205 are produced by light source 132, and strike surface 140 of light wedge 135. One of skill in the relevant art will recognize that other illumination systems may be used that provide uniform light to prism 102.

Figure 3:
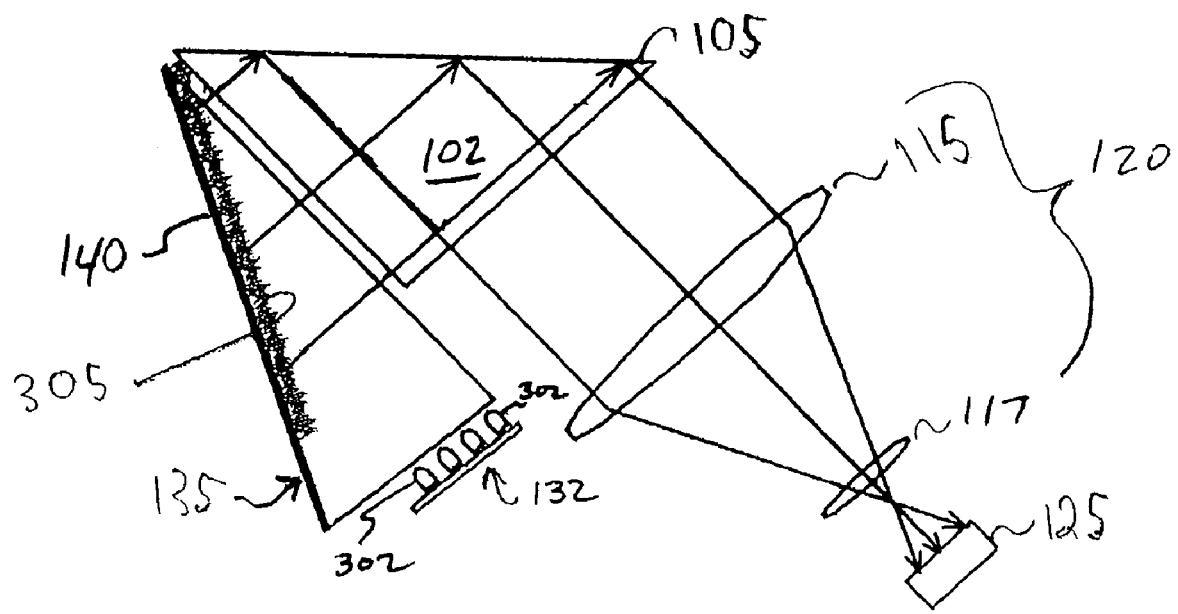
FIG. 3 is an illustration of the path of diffused light produced by the light wedge of FIG. 2.

FIG. 3 illustrates an embodiment of the present invention in which light wedge surface 140 acts as a diffuser to diffuse light from light source 132. In one embodiment, light wedge surface 140 is a painted or coated surface. In another embodiment, light wedge surface 140 is treated in another manner that results in diffusion. In still another embodiment, a diffuser is attached to light wedge surface 140. The diffused light enters prism 102 and approximately uniformly illuminates platen surface 105. The light is reflected by platen surface 105 based on the print image and is reflected to optical system 120. The light is then focused and conditioned for imaging by camera 125.

High-quality livescan instruments rely on calibrated illumination systems to provide high quality fingerprint images. Calibration in this embodiment is achieved by adjusting individual LED light sources 302 until a uniform light source is imaged by camera 125, thus compensating for any optical or LED intensity anomalies.

Ambient light entering system 100 may interfere with illumination calibration that occurs prior to print imaging as well as the actual print image. For example, if ambient light reaches light wedge surface 140, uniformity of the illumination light can be compromised. Similarly, ambient light which can enter prism 102 and reach camera 125 may interfere with image quality.

Platen surface 105 can be an area of entry for ambient light. The optical components may be enclosed in an opaque housing, except for platen surface 105 which may be exposed to an ambient environment with ambient light. If only platen surface 105 is exposed, then the only way for ambient light to reach light wedge surface 140 and/or camera 125 is through platen surface 105. The inventor recognized that the angles at which light can enter prism 102 and end up on either or both of light wedge surface 140 and camera 125 are limited, and are dictated by the geometry and refractive index of prism 102.

Figure 4A:
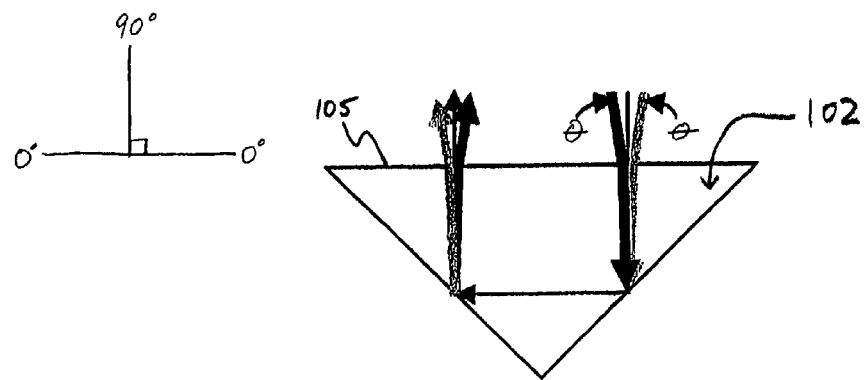
FIG. 4A is an illustration of angles at which light can enter an example prism without entering an example optical system.

FIG. 4A shows that there are a limited set of angles, for a given geometry and refractive index, such that ambient light entering prism 102 at those angles is reflected back out of prism 102 through platen surface 105. For those angles, prism 102 acts as a retro-reflector. Light entering prism 102 at those angles will likely not interfere with illumination calibration.

Figure 4B:
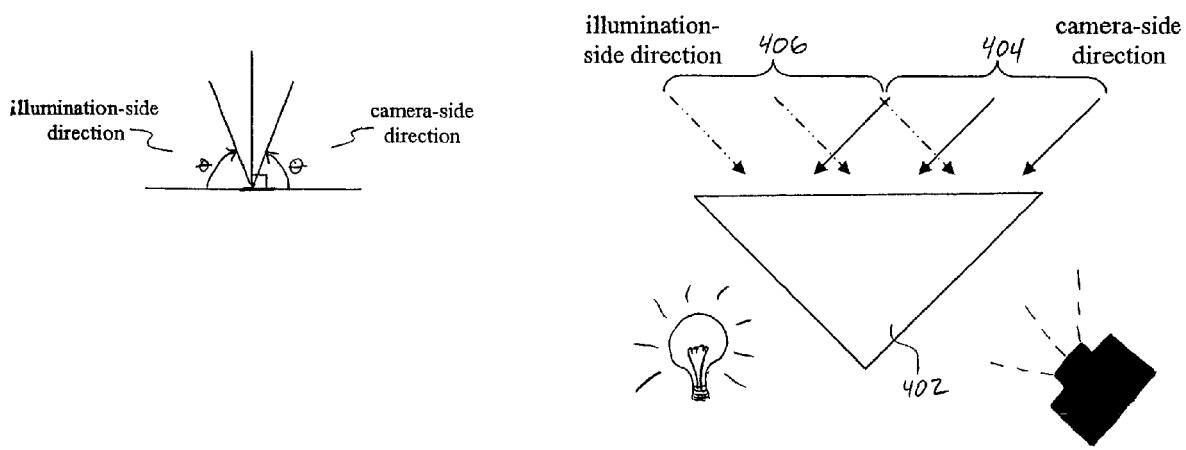
FIG. 4B is an illustration of rays incident from a camera-side direction and rays incident from an illumination-side direction.

FIG. 4B is an illustration of a prism 402 with incident ambient light rays. As shown in the legend, the direction from the side of the prism generally facing the camera toward the side of the prism facing the illumination system (right to left in FIG. 6) is herein referred to as the camera-side direction. Thus, light rays 404 incident on prism 402 are referred to as being incident from a camera-side direction. Similarly, the direction from the side of the prism generally facing the illumination system toward the side of the prism facing the camera (left to right in FIG. 6) is herein referred to as the illumination-side direction. Thus, light rays 406 incident on prism 402 are referred to as being incident from an illumination-side direction.

Referring to FIG. 4A, for example, for BK7 glass ($\eta=1.517$) and a 45/45/90 degree prism, the range of angles $\theta$ that will not interfere with light in the optical path is 11.4 degrees wide. If the angle normal to platen surface 105 is considered to be 90 degrees, as shown in the legend in FIG. 4B, angles $\theta$ greater than 84.3 degrees as measured from either the camera-side direction or the illumination-side direction will not interfere with illumination calibration or imaging. A person of skill in the relevant art will recognize that the range of angles $\theta$ can change without departing from the spirit and scope of the present invention when, for example, the geometry and/or material of prism 102 is altered.

Figure 5:
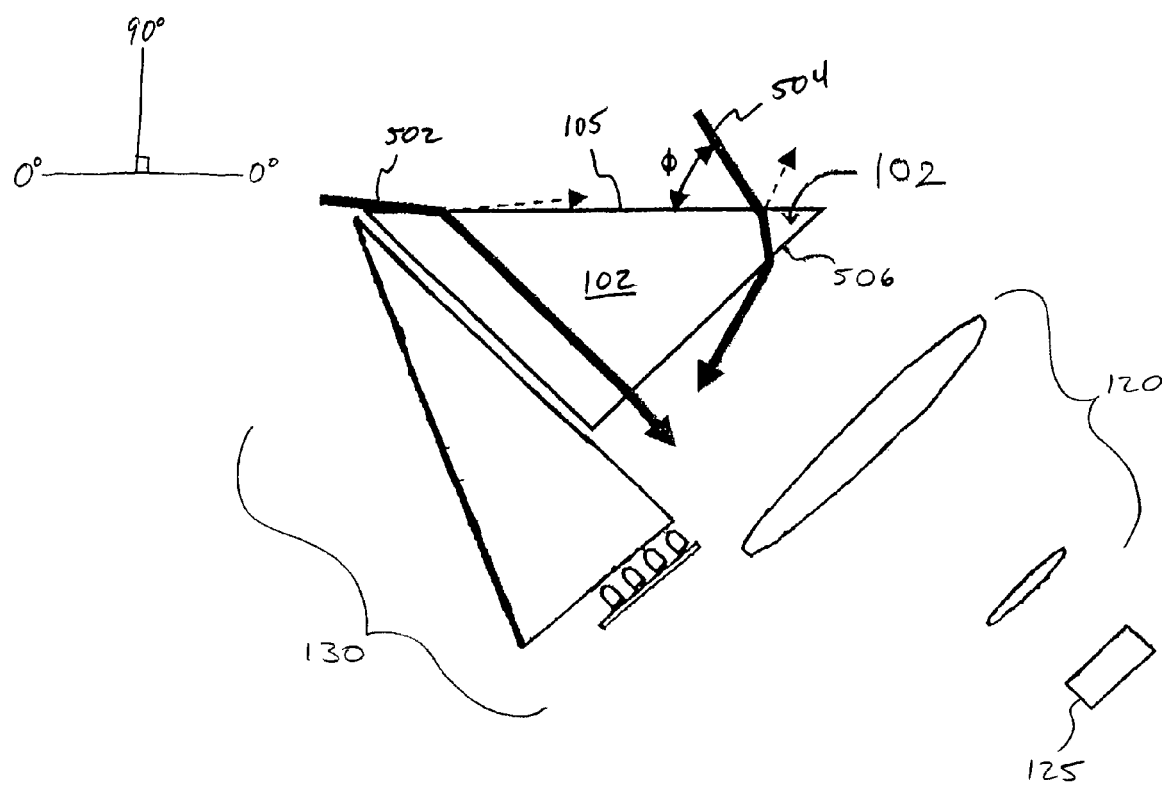
FIG. 5 is an illustration of angles at which light can enter the example optical system through the example prism.

FIG. 5 shows angles at which light can enter prism 102 from an illumination-side direction and possibly pass through into optical system 120. The angle at which the light beam exits prism 102 determines if it can ultimately reach camera 125 through optical system 120. The light will need to be nearly perpendicular to the prism face nearest camera 125, such as prism face 506, in order to have an unobstructed path to camera 125. This is especially true if optical system 120 and camera 125 are telecentric. As illustrated by light ray 502, only light rays which barely graze the surface of prism 102 have a chance of exiting prism 102 in a way to find camera 125. However, since the angle is extremely shallow, the majority of light in light ray 502 is reflected off platen surface 105 and therefore does not enter prism 102.

The intensity of the light from light ray 502 that does enter prism 102 is insignificant compared to light from illumination source 132. Light from light ray 502 therefore will not interfere with illumination calibration or imaging.

For steeper light rays, such as light ray 504, a greater amount of light enters prism 102. However, due to refraction as shown in FIG. 5, light ray 504 exits prism 102 at an angle such that it will not enter camera 125. Even if light ray 504 enters optical system 120, it enters at such an angle that lenses in optical system 120 will not focus or redirect light ray 504 into the aperture of camera 125. For BK7 glass ($\eta=1.517$) and a 45/45/90 degree prism, the range of angles $\phi$ for which ambient light from an illumination-side direction can enter the prism without substantially disturbing camera 125 is thus about 0 to 84.3 degrees.

Figure 6:
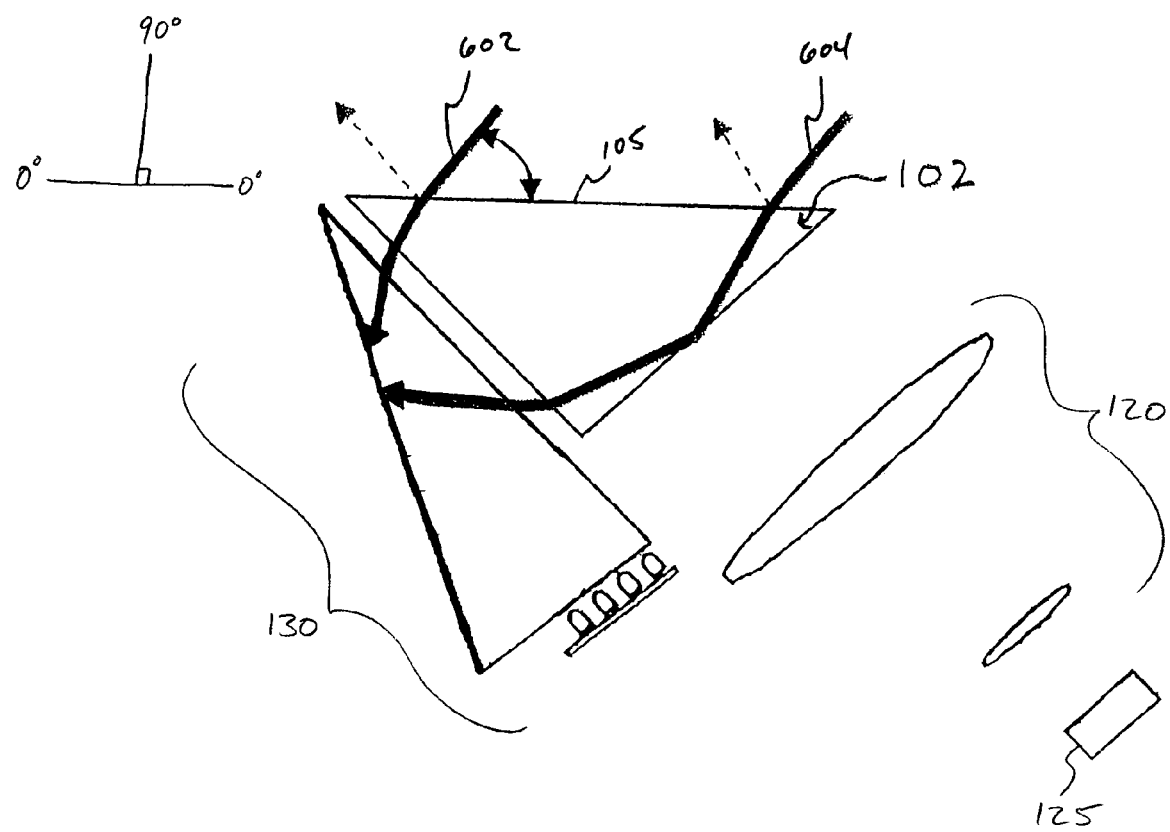
FIG. 6 is an illustration of angles at which light can enter the example prism and interfere with the example illumination system.
Figure 7:
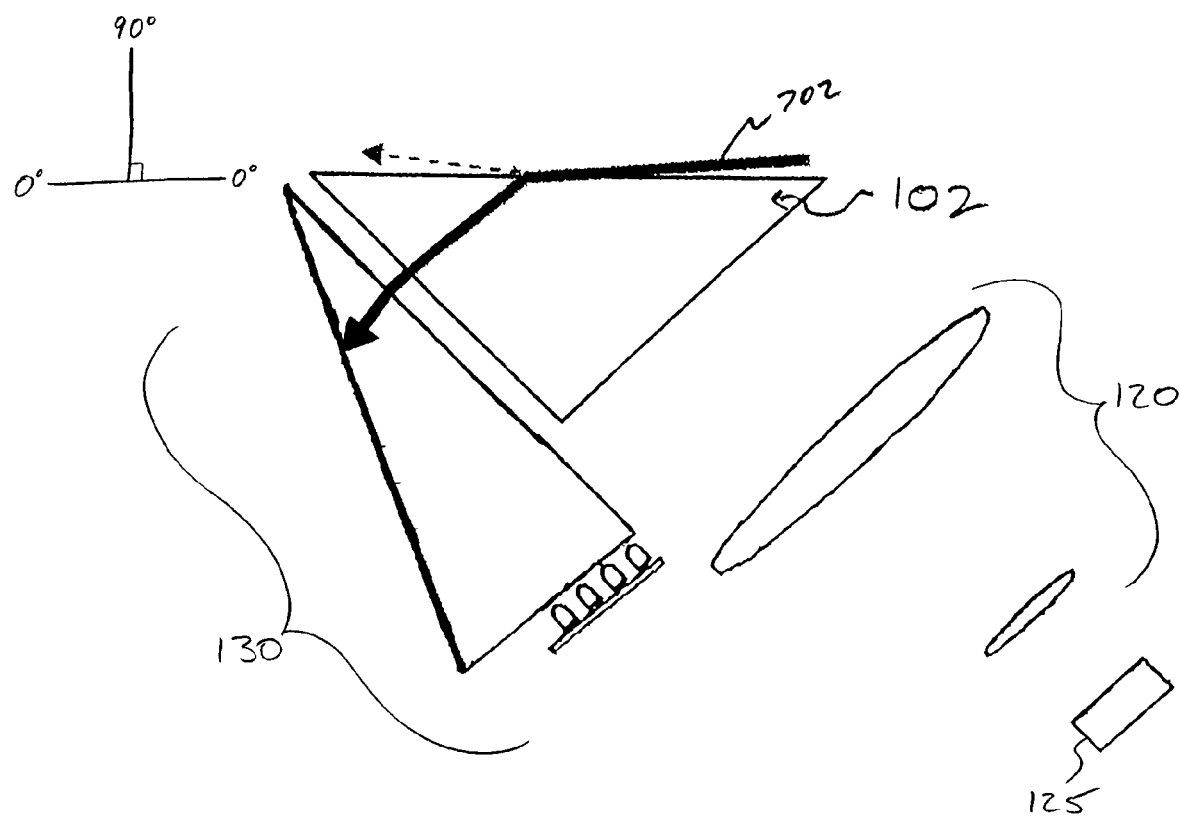
FIG. 7 is an illustration of angles at which light can enter the example prism without affecting the example illumination system.

FIGS. 6 and 7 illustrate how light entering from a camera-side direction can make its way through prism 102 and reach illumination system 130. Ambient light that reaches illumination system 130 can reduce the accuracy of any illumination calibration. Additionally, ambient light entering illumination system 130 can be reflected back into prism 102 in unpredictable ways, and may interfere with the image captured by camera 125.

Because their entry angles are not shallow, light rays 602 and 604 illustrated in FIG. 6 are not reflected away by platen surface 105. Instead, a sufficient portion of each of light rays 602 and 604 is transmitted through prism 102, and will likely reach light wedge 135. Therefore, ambient light following paths such as light rays 602 and 604 can be intense enough to cause changes in light levels of the illumination system 130 as imaged by optics system 120 and camera 125.

In FIG. 7, the angle of light ray 702 is shallow enough that the majority of light in light ray 702 is reflected off of platen surface 105. Light ray 702 therefore will not significantly interfere with illumination system 130. However, it will still likely enter illumination system 130. For BK7 glass ($\eta=1.517$) and a 45/45/90 degree prism, light entering at angles between 0 and 84.3 degrees can enter illumination system 130.

Figure 8:
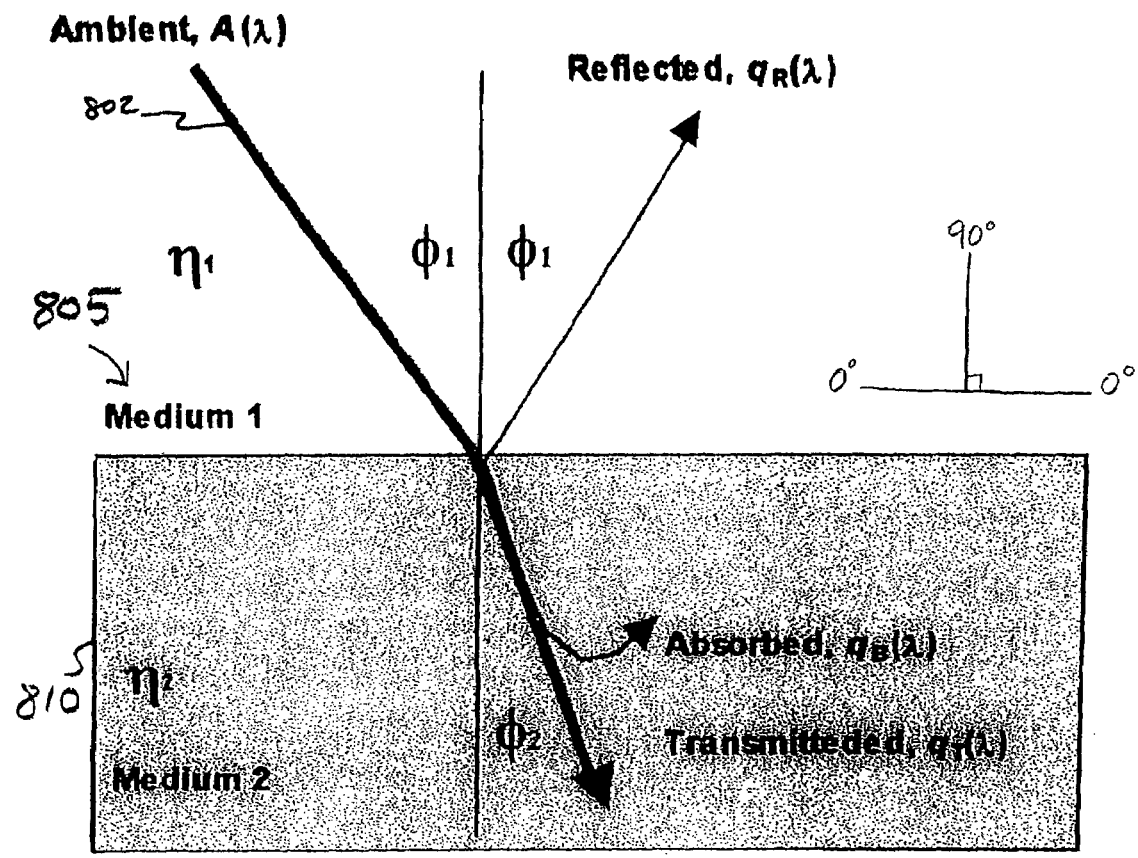
FIG. 8 is a diagram depicting the effects of refractive index on transmission intensity of a light beam.

FIG. 8 illustrates how to determine whether ambient light entering prism 130 will adversely interfere with either illumination system 130 or camera 125 based on its incidence angle. Most of the energy carried in rays entering at shallow angles is reflected off of surface 105. Thus, the intensity of light transmitted from rays having shallow angles is low. On the other hand, most of the energy carried in rays entering at steeper angles is transmitted through prism 102. The intensity of light transmitted from rays having steeper angles is higher than the intensity of light transmitted from rays having shallower angles. FIG. 8 shows a light beam 802 from a first medium 805 interacting with a second medium 810. In FIG. 8, $\phi_1$ is the angle of incidence, $\phi_2$ is the angle of transmission, $\eta_1$ is the index of refraction of first medium 805, and $\eta_2$ is the index of refraction for second medium 810.

Based on the intensity, or quantum flux Q, it can be determined whether a light ray entering from a specific angle will have a negative effect on either illumination system 130 or optical system 120. The total Q of light beam 802 is a sum of the intensity $q_R$ of light reflected by the surface of second medium 810, the intensity $q_T$ of light transmitted by second medium 810, and the intensity $q_A$ of light absorbed by second medium 810. Specifically, $$Q = q_R + q_T + q_B = QP + Q(1-P), \quad \text{(Eq. 1)}$$

where P is the proportion of light reflected and 1–P is the proportion of light entering second medium 810. For purposes of explanation, the absorbed intensity $q_A$ is considered negligible and is thus not calculated herein.

The greater the refractive index $\eta_2/\eta_1$, the more light is reflected, resulting in a larger value for P. The larger the value of P, the lower the intensity of light transmitted by second medium 810. P is determined based on velocities $v_1$ and $v_2$ within first medium 805 and second medium 810, respectively. Specifically, $$P = \left[\frac{v_2 - v_1}{v_2 + v_1}\right]^2. \quad \text{(Eq. 2)}$$

Thus, based on P, transmitted intensity $q_T$ of light beam 802 can be calculated. If transmitted intensity $q_T$ is above an acceptable threshold, then enough light can enter, for example, prism 102 so as to adversely interfere with illumination system 130 or camera 125. One of skill in the art will recognize that the acceptable threshold will vary depending upon the system and accuracy required.

Referring to the embodiment of system 100, first medium 805 corresponds to air, and second medium 810 corresponds to prism 102. For a prism with BK7 glass ($\eta=1.517$), light would have to strike platen surface 105 at an angle greater than 15 degrees before enough light starts to enter prism 102 to have any significance with respect to illumination system 130.

As shown in the legend in FIG. 8, the angle parallel to the surface, as measured from either side of the prism, is 0 degrees. The angle normal to the surface is 90 degrees. Because of low transmitted intensity values, light from either side of prism 102 having an incidence angle ranging from 0 to 15 degrees will likely not adversely interfere with the print image. Similarly, as discussed with respect to FIG. 4, light from either side of prism 102 having an incidence angle greater than 84.3 degrees will also not adversely interfere with the print image. As discussed with respect to FIG. 5, light from an illumination-side direction having an incidence angle ranging from about 0 to 84.3 degrees will not adversely interfere with the print image. Therefore, for the embodiment described with respect to system 100, the range of incidence angles for ambient light that may adversely interfere with the print image is about 15 to 84.3 degrees as measured from the camera-side direction.

Figure 9:
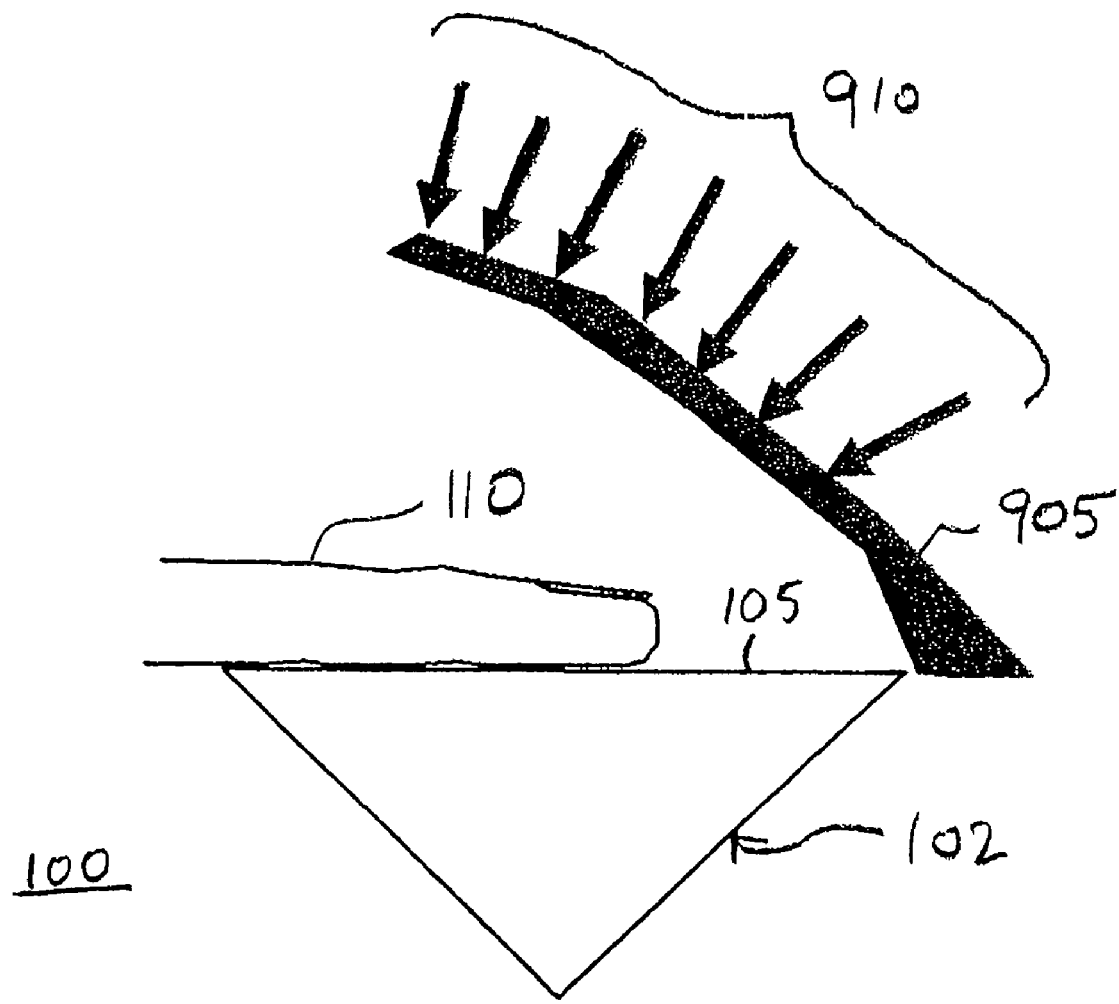
FIG. 9 is an illustration of a light shroud according to an embodiment of the present invention.

FIG. 9 illustrates an embodiment of the present invention that prevents ambient light from adversely affecting either of illumination system 130 and camera 125. As discussed above, ambient light only affects a fingerprint image in, for example, system 100 if it enters platen surface 105 from a particular range of angles from a camera-side direction, such as, for example, 15 to 84.3 degrees. Ambient light from that range of angles is shown as plurality of ambient light rays 910. The present invention includes a light shroud 905. Light shroud 905 is specifically designed to block plurality of ambient light rays 910 in the particular range of angles from entering prism 102. Light shroud 905 may be made of any opaque material or material that would otherwise reduce or prevent ambient light from passing through. Light shroud 905 may be angled, curved, or flat. In one embodiment, light shroud 905 only blocks light from that range of angles which may adversely interfere with the print image. In another embodiment, light shroud 905 blocks ambient light from other angles in addition to those which may adversely interfere with the print image.

When light shroud 905 is in an open position (as shown), light shroud 905 blocks plurality of ambient light rays 910 while allowing ample access to platen surface 105 by finger 110. Platen surface 105 also remains easily visible by the user, and sufficient room to perform fingerprint rolls is provided. In one embodiment, the position of light shroud 905 is fixed. In another embodiment, the light shroud 905 has limited movement, and varies position but does not open to any further position that may allow one or more of plurality of ambient light rays 910 to enter prism 102. In still another embodiment, light shroud 905 opens further and/or can be completely removed.

Figure 10:
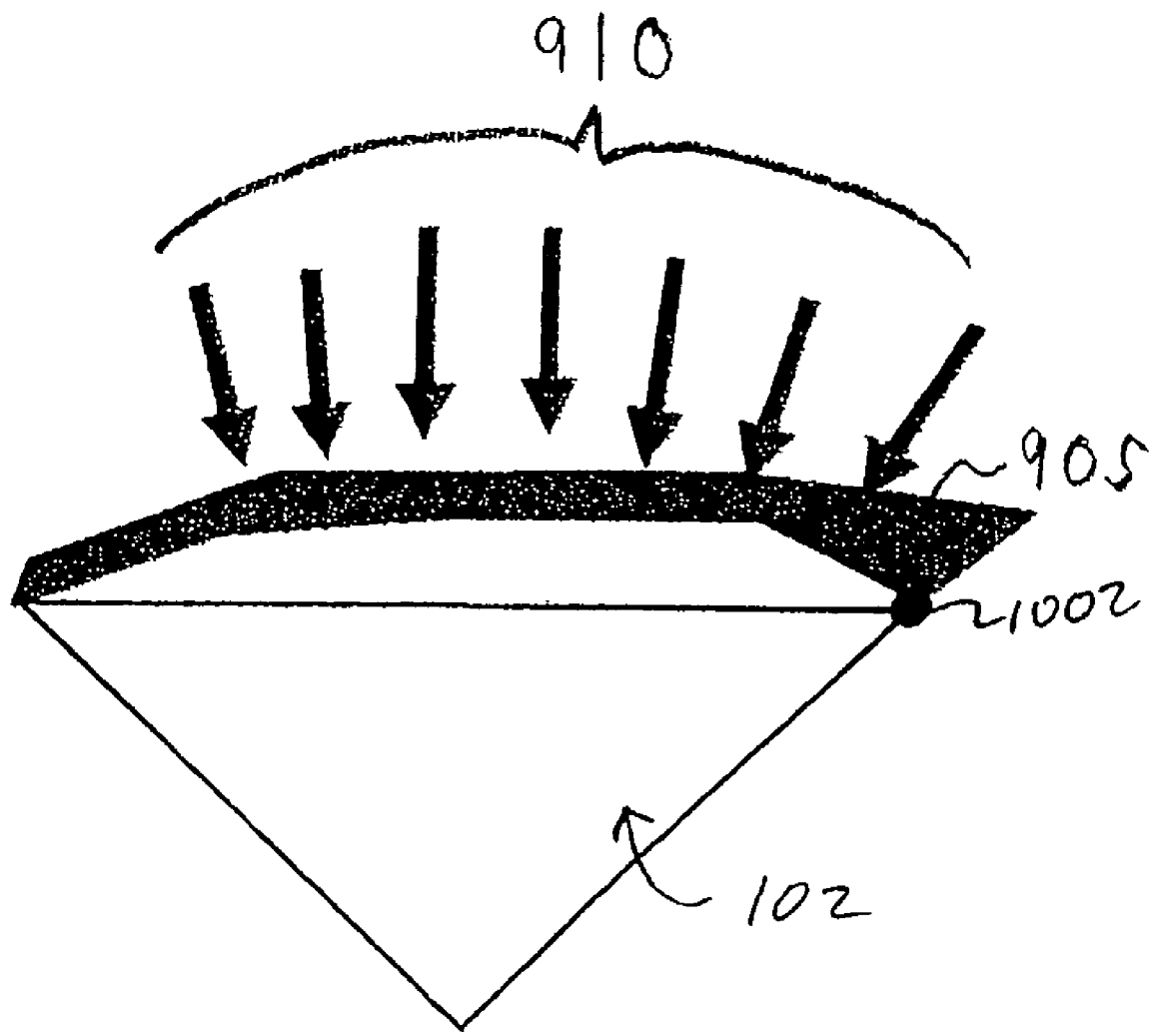
FIG. 10 is another illustration of a light shroud according to an embodiment of the present invention.

FIG. 10 illustrates an embodiment of the present invention wherein light shroud 905 includes a hinge 1002, so that light shroud 905 can be closed to protect platen surface 105 when not in use.

It should be noted that there are a number of other methods which act to limit the effects of background ambient light on image quality. Light shroud 905 may replace or be used in addition to the other methods to improve ambient light rejection of fingerprint system 100.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical print scanning system, comprising:
   a live print scanner having a platen for receiving an object having a print pattern, wherein the platen is the surface of a prism; and
   a light shroud,
   wherein the light shroud allows access to the live print scanner by a user while blocking ambient light from entering the live print scanner at angles which may adversely interfere with an image produced by the live print scanner.

2. The optical print scanning system of claim 1, wherein the live print scanner comprises:
   an illumination system for illuminating the platen;
   an optical system for conditioning and focusing light reflected from the platen; and
   a camera for imaging the light reflected from the platen.

3. The optical print scanning system of claim 2, wherein the illumination system comprises:
   a light source; and
   a light wedge, wherein the light wedge directs light from the light source to the platen.

4. The optical print scanning system of claim 2, wherein the light shroud blocks ambient light incident from a camera-side direction at incidence angles in the range of about 0 to 84.3 degrees.

5. The optical print scanning system of claim 4, wherein the light shroud blocks ambient light incident from an illumination-side direction at incidence angles in the range of about 15 to 84.3 degrees.

6. The optical print scanning system of claim 1, wherein the light shroud has an open and closed position, such that the light shroud blocks the ambient light when in the open position and protects the live print scanner when in the closed position.

7. An optical fingerprint system, comprising:
   a platen that receives a fingerprint, wherein the platen is a surface of a prism;
   an illumination system that illuminates the platen;
   a camera that images the fingerprint; and
   a light shroud, wherein the light shroud allows access to the platen while blocking ambient light from entering at all angles which may adversely interfere with the illumination system or the camera.

8. The fingerprint system of claim 7, wherein the angles range from about 0 to 84.3 degrees.

9. The fingerprint system of claim 8, wherein the angles range from about 15 to 84.3 degrees.

10. The fingerprint system of claim 7, wherein the light shroud has an open and closed position, such that the light shroud blocks said ambient light when in the open position, and the light shroud protects the platen when in the closed position.

11. The fingerprint system of claim 7, wherein the light shroud is curved.

12. The fingerprint system of claim 7, wherein the light shroud is angled.

13. The fingerprint system of claim 7, wherein the illumination system comprises a diffuser.

14. A cover for an optical scanning system, comprising:
   a light-blocking shield in close proximity to a platen of the optical scanning system, wherein the platen is a surface of a prism,
   wherein the light-blocking shield has an open position in which the light-blocking shield blocks ambient light from entering the platen from angles that adversely interfere with the optical scanning system when in the open position, and
   wherein the light-blocking shield has a closed position in which the light-blocking shield fully covers the platen.

15. The cover of claim 14, wherein the light-blocking shield blocks ambient light from entering the platen at angles less than about 84.3 degrees.

16. The cover of claim 15, wherein the light blocking-shield blocks ambient light from entering the platen at angles between about 15 and 84.3 degrees.

17. The cover of claim 14, wherein the light-blocking shield blocks ambient light from entering the platen from a camera-side direction.

18. The cover of claim 17, wherein the light-blocking shield blocks ambient light from entering the platen from a camera-side direction at angles between about 15 and 84.3 degrees.

19. The cover of claim 14, wherein the light-blocking shield is curved.

20. The cover of claim 14, wherein the light-blocking shield is angled.

21. The cover of claim 14, wherein the light-blocking shield is straight.

* * * * *